US012018612B2

(12) United States Patent
Hollingsworth

(10) Patent No.: US 12,018,612 B2
(45) Date of Patent: Jun. 25, 2024

(54) ROCKER HOUSING FOR AN INTERNAL COMBUSTION ENGINE

(71) Applicant: Caterpillar Shrewsbury Limited, Shrewsbury (GB)

(72) Inventor: Philip Hollingsworth, Bromsgrove (GB)

(73) Assignee: Caterpillar Shrewsbury Limited, Shrewsbury (GB)

( * ) Notice: Subject to any disclaimer, the term of this patent is extended or adjusted under 35 U.S.C. 154(b) by 0 days.

(21) Appl. No.: 18/038,608

(22) PCT Filed: Nov. 17, 2021

(86) PCT No.: PCT/EP2021/025449

§ 371 (c)(1),
(2) Date: May 24, 2023

(87) PCT Pub. No.: WO2022/111847

PCT Pub. Date: Jun. 2, 2022

(65) Prior Publication Data

US 2024/0011431 A1 Jan. 11, 2024

(30) Foreign Application Priority Data

Nov. 24, 2020 (GB) ...................................... 2018450

(51) Int. Cl.
*F02B 77/00* (2006.01)
*F02M 37/00* (2006.01)
*F02M 61/14* (2006.01)

(52) U.S. Cl.
CPC ......... *F02B 77/00* (2013.01); *F02M 37/0052* (2013.01); *F02M 61/14* (2013.01)

(58) Field of Classification Search
CPC ...... F02B 77/00; F02M 37/0052; F02M 61/14
(Continued)

(56) References Cited

U.S. PATENT DOCUMENTS 3,194,221 A 7/1965 Dinger et al.
3,402,703 A 9/1968 Dickerson et al.
(Continued)

FOREIGN PATENT DOCUMENTS

EP 0526309 A1 2/1993
EP 3388661 A1 10/2018
(Continued)

OTHER PUBLICATIONS

International Search Report related to Application No. PCT/EP2021/025449; dated Mar. 4, 2022.
(Continued)

*Primary Examiner* — Hai H Huynh

(57) ABSTRACT

A rocker housing is configured to enclose a rocker shaft and rocker arms connected to push rods that protrude from a cylinder head of an internal combustion engine. The rocker housing comprises a sidewall configured to enclose the rocker shaft and a top wall extending laterally from an upper portion of the sidewall so as to extend over the rocker arms. The rocker housing further comprises an aperture configured to accommodate a fuel injector or a fuel supply pipe for supplying fuel to a fuel injector of the internal combustion engine. The rocker housing further comprises a fuel return channel extending within at least a part of the sidewall. The fuel return channel comprises an inlet at the interior surface of the sidewall configured to receive excess fuel from the injector; an outlet at an exterior surface of the sidewall configured to output the excess fuel, wherein the outlet is laterally offset from the inlet; and an interior passage extending between the inlet and the outlet. The interior passage is formed integrally in the sidewall of the rocker housing between the interior surface of the sidewall and the exterior surface of the sidewall. The interior passage has a minor component in a direction between the interior surface and the exterior surface of the sidewall and has a major com- (Continued)

ponent in a direction of lateral offset between the inlet and the outlet.

21 Claims, 16 Drawing Sheets

(58) Field of Classification Search
USPC .................. 123/468, 469, 470, 195 C, 198 E
See application file for complete search history.

(56) References Cited

U.S. PATENT DOCUMENTS

| | | | | |
|---|---|---|---|---|
| 3,489,435 | A | 1/1970 | Weber et al. | |
| 3,845,748 | A | 11/1974 | Eisenberg | |
| 4,384,557 | A | 5/1983 | Johnson | |
| 4,601,275 | A | 7/1986 | Weinand | |
| 5,501,197 | A | 3/1996 | Smith | |
| 6,840,225 | B2 | 1/2005 | Sandoval | |
| 6,880,528 | B2 | 4/2005 | Wendelin et al. | |
| 7,178,508 | B2 | 2/2007 | Shioiri et al. | |
| 10,968,861 | B2 * | 4/2021 | Kageyama | F01M 9/107 |
| 2004/0211394 | A1 | 10/2004 | Yager et al. | |
| 2020/0132015 | A1 | 4/2020 | Kageyama | |

FOREIGN PATENT DOCUMENTS

| | | | |
|---|---|---|---|
| JP | 2006348783 | A | 12/2006 |
| WO | 0190567 | A1 | 11/2001 |
| WO | 2014094800 | A1 | 6/2014 |

OTHER PUBLICATIONS

Great Britain Search Report related to Application No. 2018450.3; dated Apr. 23, 2021.

* cited by examiner

ROCKER HOUSING FOR AN INTERNAL COMBUSTION ENGINE

CROSS-REFERENCE TO RELATED APPLICATION

This Application is a 35 USC § US National Stage filing of International Application No. PCT/EP2021/025449 filed on Nov. 17, 2021, which claims priority under the Paris Convention to Great Britain Patent Application No. 2018450.3 filed on Nov. 24, 2020.

TECHNICAL FIELD

The disclosure related to a rocker housing for an internal combustion engine having integrated fuel spill return functionality.

BACKGROUND

In the field of internal combustion engines, it is known to provide a rocker housing to enclose a rocker shaft and rocker arms connected to push rods that protrude from a cylinder head of an internal combustion engine.

It is also known to provide apertures in the rocker housing that enable external pipework to be attached, often by means of a banjo fitting, for channelling fluid that leaks from a fuel injector of the internal combustion engine back to the fuel tank.

Such external pipework is likely to be located where it would be vulnerable to damage. It is also likely to involve multiple connection points which may become potential leak points. Furthermore, its location proximate the rocker housing may give rise to interference with other parts, such as for example the heads of fixings that are used to fasten the cylinder head.

SUMMARY OF THE DISCLOSURE

Against this background there is provided a rocker housing configured to enclose a rocker shaft and rocker arms connected to push rods that protrude from a cylinder head of an internal combustion engine, the rocker housing comprising:

a sidewall configured to enclose the rocker shaft and the rocker arms and having a lower portion with a surface configured to contact an outer surface of the cylinder head;

a top wall extending laterally from an upper portion of the sidewall so as to extend over the rocker arms;

such that an interior surface of the sidewall combined with an interior surface of the top wall together bound an interior volume of the rocker housing for enclosing the rocker arms;

the rocker housing further comprising:

an aperture extending from an exterior surface of the top wall to the interior surface of the top wall and configured to accommodate a fuel injector or a fuel supply pipe for supplying fuel to a fuel injector of the internal combustion engine accessible from the interior volume of the rocker housing;

a fuel return channel extending within at least a part of the sidewall and comprising:

an inlet at the interior surface of the sidewall configured to receive excess fuel from the injector;

an outlet at an exterior surface of the sidewall configured to output the excess fuel, wherein the outlet is laterally offset from the inlet; and an interior passage extending between the inlet and the outlet, the interior passage formed integrally in the sidewall of the rocker housing between the interior surface of the sidewall and the exterior surface of the sidewall;

wherein the interior passage has a minor component in a direction between the interior surface and the exterior surface of the sidewall and has a major component in a direction of lateral offset between the inlet and the outlet.

This reduces the requirement for external pipework, reduces scope for fuel leakage paths in external pipework, reduces component count, reduces assembly complexity, reduces the number of external components that may otherwise interfere with access to components of the engine proximate the rocker housing, and reduces the number of disconnections that need to be made to remove the rocker housing in order to gain access to its interior.

One or both of the sidewall and the top wall is of cast metal.

The aperture is one of a number of apertures, wherein the number of apertures corresponds with the number of fuel injectors that the rocker housing is configured to accommodate.

The inlet of the fuel return channel may be one of a number of inlets, wherein the number of inlets corresponds with the number of fuel injectors that the rocker housing is configured to accommodate, wherein each inlet of the number of inlets is in fluid communication with the interior passage of the fuel return channel.

The rocker housing may comprise a lateral bracing portion extending between opposing faces of the interior surface of the sidewall.

At least a portion of the interior passage is formed integrally within the lateral bracing portion.

In this way, greater flexibility is available regarding the relative locations of the one or more inlets and the outlet.

The interior volume of the rocker housing may be subdivided by one or more bracing portions, wherein a number of subdivisions corresponds with the number of cylinders that the rocker housing is configured to cover.

The inlet may extend from the interior surface of the sidewall, beyond the interior passage, to the exterior surface of the sidewall.

The inlet may comprise a bore extending from the interior surface.

The inlet may comprise a counter bore extending from the exterior surface, wherein the counter bore is coaxial with the bore.

The inlet may comprise an annular surface that accommodates a change in diameter between the bore and the counter bore.

In a further aspect, there is provided a rocker housing assembly comprising:

a rocker housing as described herein; and a plug that prevents fluid communication between the interior passage and the exterior surface of the sidewall.

The plug may be received into the counter bore so as to seal the counter bore.

The plug may have a diameter greater than its thickness.

The rocker housing assembly may further comprise:

a spill tube for providing fluid communication between the injector of the internal combustion engine and the inlet of the fuel return channel, thereby providing fluid communication between the injector and the fuel return channel.

The spill tube may comprise a tubular component that is received into the bore.

The spill tube may comprise a shaft and an annular flange, wherein:

the shaft has an external diameter that is smaller than an internal diameter of the bore such that the shaft is movable radially with respect to the bore; and the annular flange has an external diameter that is smaller than an internal diameter of the counter bore such that the annular flange is movable radially within the counter bore.

In this way, variation in position of the spill tube relative to the rocker housing may be accommodated.

The rocker housing may further comprise a seal located between the annular flange and the annular surface.

The seal may have an external diameter that is smaller than the internal diameter of the counter bore and an inner diameter that is smaller than the external diameter of the shaft of the spill tube.

In this way, the seal may accommodate variation n position of the spill tube relative to the rocker housing.

The rocker housing assembly may further comprise a fuel return pipe in fluid communication at a first end with the outlet of the fuel return channel and at a second end with a fuel tank.

In a further aspect, there may be provided an internal combustion engine comprising a rocker housing or a rocker housing assembly as described herein.

In a further aspect, there is provided a rocker housing assembly comprising:

a rocker housing configured to enclose a rocker shaft and rocker arms connected to push rods that protrude from a cylinder head of an internal combustion engine, the rocker housing comprising:

a sidewall configured to enclose the rocker shaft and the rocker arms and having a lower portion with a surface configured to contact an outer surface of the cylinder head surrounding the rocker arms;

a top wall extending laterally from an upper portion of the sidewall so as to extend over the rocker arms;

such that an interior surface of the sidewall combined with an interior surface of the top wall together bound an interior volume of the rocker housing for enclosing the rocker arms;

the rocker housing further comprising:

an aperture extending from an exterior surface of the top wall to the interior surface of the top wall and configured to accommodate a fuel injector or a fuel supply pipe for supplying fuel to a fuel injector of the internal combustion engine accessible from the interior volume of the rocker housing;

a fuel return channel extending within at least a part of the sidewall and comprising:

an inlet at the interior surface of the sidewall configured to receive excess fuel from the injector;

an outlet at an exterior surface of the sidewall configured to output the excess fuel, wherein the outlet is laterally offset from the inlet; and an interior passage extending between the inlet and the outlet, the interior passage formed integrally in the sidewall of the rocker housing between the interior surface of the sidewall and the exterior surface of the sidewall;

wherein the interior passage has a minor component in a direction between the interior surface and the exterior surface of the sidewall and has a major component in a direction of lateral offset between the inlet and the outlet;

wherein the inlet extends from the interior surface of the sidewall, beyond the interior passage, to the exterior surface of the sidewall and the inlet a bore extending from the interior surface;

wherein the rocker housing assembly further comprises a spill tube providing fluid communication between the injector of the internal combustion engine and the inlet of the fuel return channel, thereby providing fluid communication between the injector and the fuel return channel;

wherein the spill tube comprises a tubular component that is received into the bore.

BRIEF DESCRIPTION OF THE DRAWINGS

Specific embodiments of the disclosure are now described with reference to the following Figures in which.

DETAILED DESCRIPTION

Figure 1:
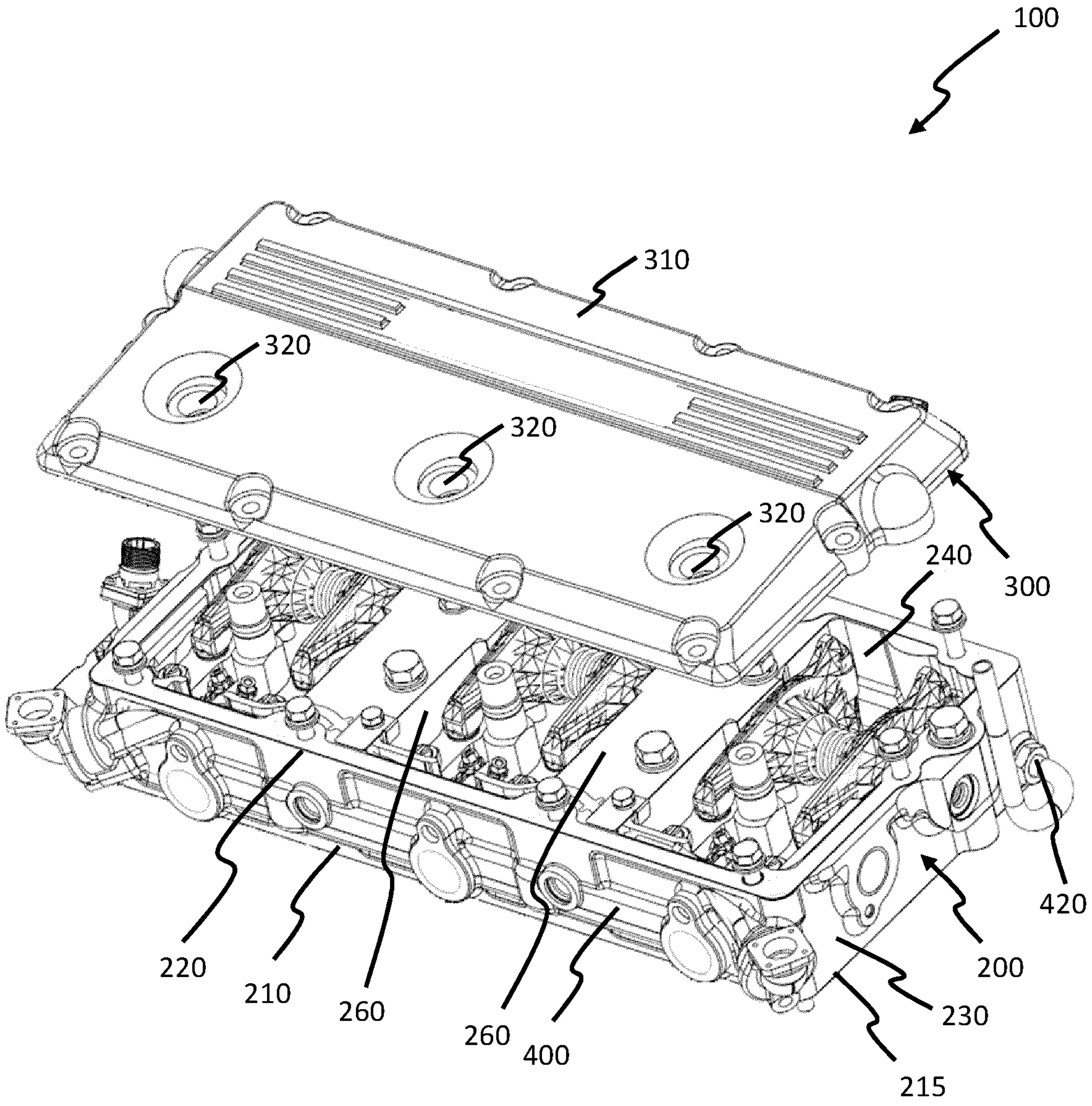
FIG. 1 shows a rocker housing in accordance with the disclosure.

FIG. 1 shows a rocker housing 100 in accordance with the present disclosure.

The rocker housing 100 is configured to enclose a rocker shaft and rocker arms connected to push rods that protrude from a cylinder head of an internal combustion engine 10.

Figure 2:
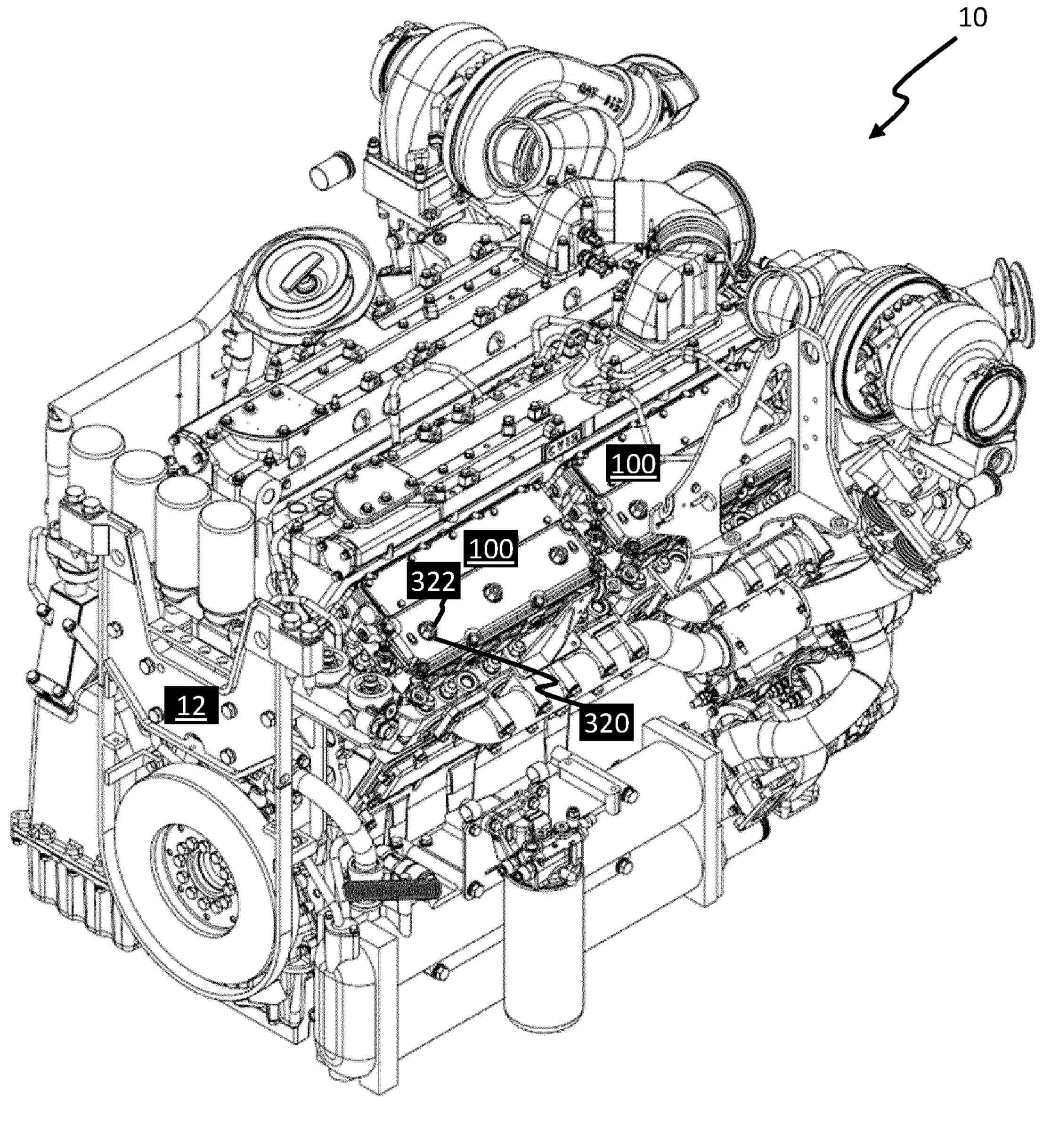
FIG. 2 shows an internal combustion engine on which two rocker housings in accordance with the disclosure are visible.
Figure 3:
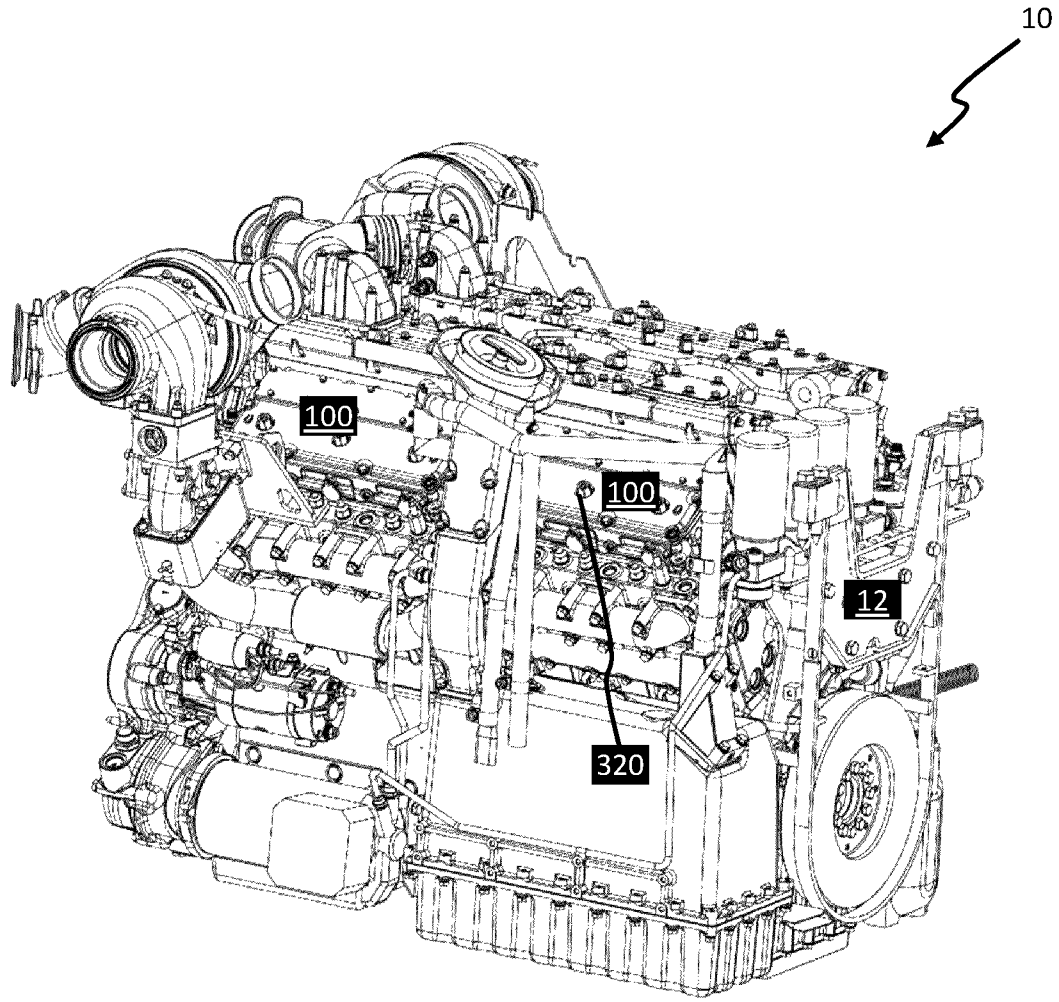
FIG. 3 shows the internal combustion engine of FIG. 2 from an opposite side on which two further rocker housings in accordance with the disclosure are visible.

In one particular application, shown in FIGS. 2 and 3, involves an internal combustion engine 10 having twelve cylinders. Six cylinders are on a first side of the internal combustion engine 10, visible in FIG. 2, while a further six cylinders are on a second side, opposite the first side, visible in FIG. 3. This application uses four rocker housings 100, each of which is configured for use with three of the twelve cylinders. As such, there are two rocker housings 100 on each side of the internal combustion engine 10.

In the particular example of FIGS. 2 and 3, each rocker housing is configured to enclose six rocker arms connected to six push rods (two per cylinder) that protrude from the cylinder head of the internal combustion engine 10.

Referring again to FIG. 1, the rocker housing 100 comprises a sidewall 200 and a top wall 300. FIG. 1 is an exploded view showing the top wall 300 detached from the sidewall 200 such that interior detail is visible.

The sidewall 200 is configured to surround the rocker arms and rocker shaft(s). The sidewall 200 has a lower portion 210 with a surface 215 configured to contact an outer surface of the cylinder head surrounding the rocker arms.

The sidewall 200 may comprise one or more lateral braces 260 that extend between opposite sides of the sidewall 200.

The top wall extends laterally from an upper portion 220 of the sidewall 200 so as to extend over the rocker arms.

An interior surface 240 of the sidewall 200 combined with an interior surface of the top wall together bound an interior volume of the rocker housing for enclosing the rocker arms.

The rocker housing further comprises an aperture 320 that extends from an exterior surface 310 of the top wall 300 to the interior surface of the top wall 300. The aperture 320 is configured to accommodate a fuel injector 322 or a fuel supply pipe for supplying fuel to a fuel injector of the internal combustion engine accessible from the interior volume of the rocker housing 100.

In the embodiment of FIG. 1, there are three such apertures 320 each of which is configured to accommodate a fuel injector 322 or fuel supply pipe of the internal combustion engine 10. In the FIG. 3 embodiment, there are again three apertures 320, each of which is shown accommodating a fuel injector 322. An upper portion of each fuel injector 322 is shown protruding out of each aperture 320. A fuel supply pipe may then be connected to the upper portion of each fuel injector 322. A threaded exterior of the upper portion of each fuel injector 322 may facilitate connection to its fuel supply pipe (not shown).

In the example internal combustion engine of FIGS. 2 and 3, there is one fuel injector 322 for each cylinder. However, there may be more than one fuel injector 322 per cylinder.

A seal may be located to fill an annular gap between an interior surface of the aperture 320 and an exterior surface of the fuel injector 322 or fuel supply pipe.

The internal combustion engine 10 of FIGS. 2 and 3 comprises twelve cylinders, six on each side of the internal combustion engine 10. Each cylinder of the twelve cylinders receives its supply of fuel via its corresponding fuel injector 322 that protrudes from its respective aperture 320 in the exterior surface 310 of the top wall 300.

Figure 4:
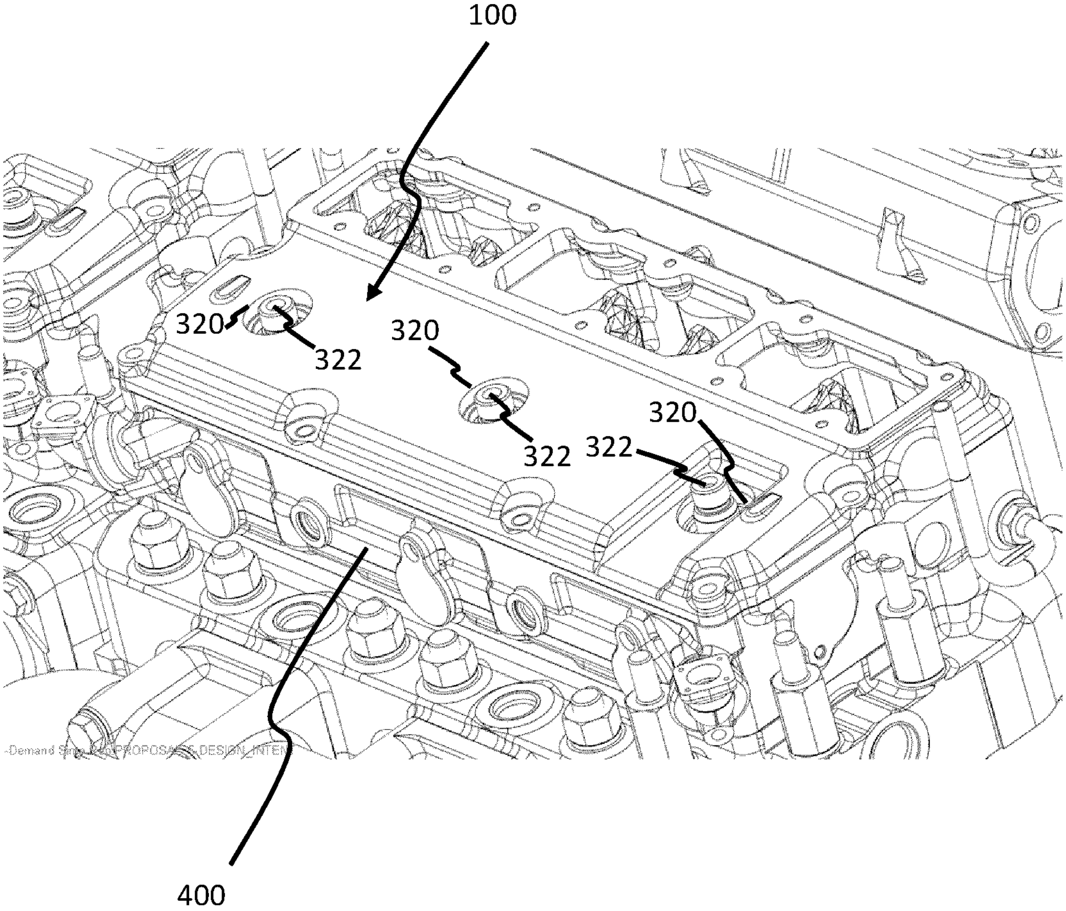
FIG. 4 shows part of a rocker housing in accordance with the disclosure in situ on an internal combustion engine.
Figure 5:
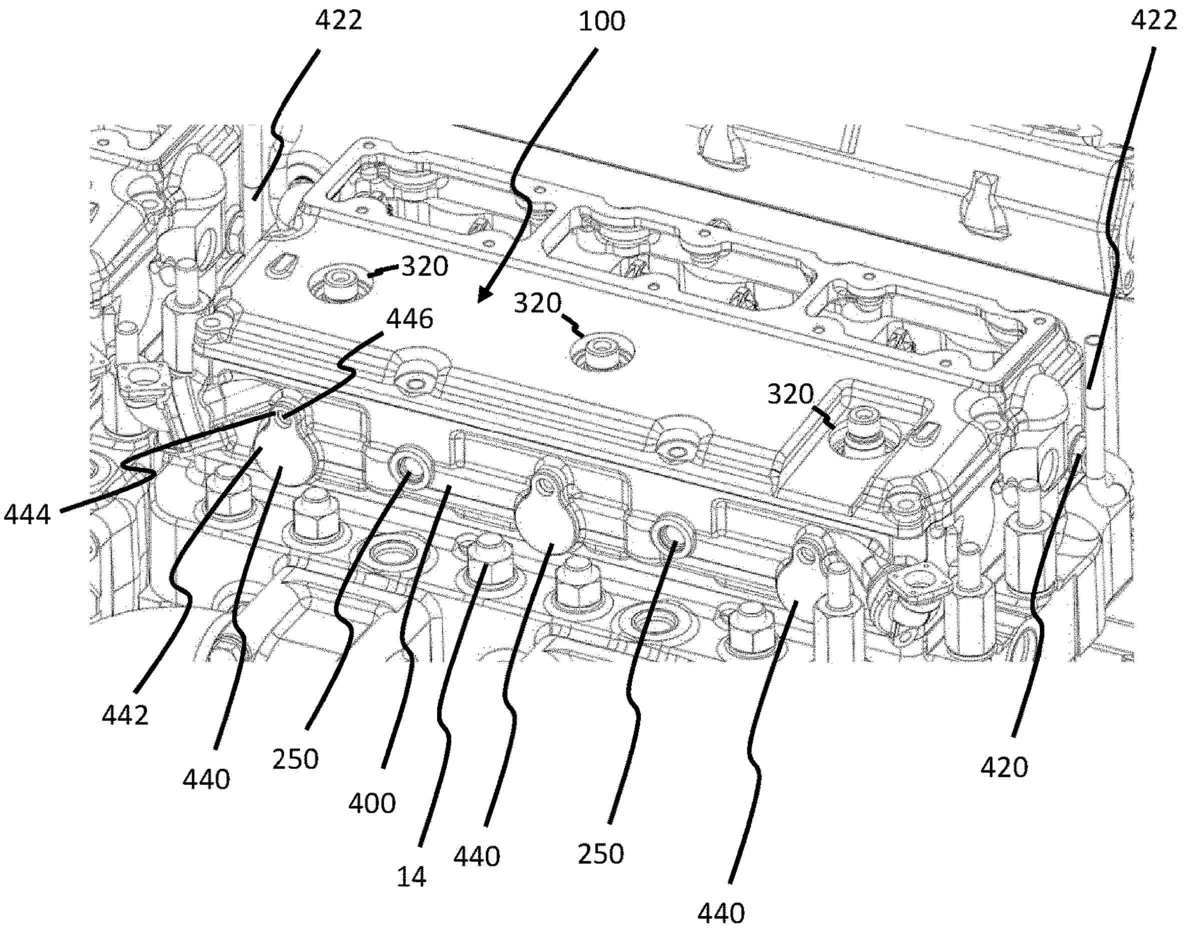
FIG. 5 shows the rocker housing of FIG. 4 from a different perspective.

FIGS. 4 and 5 provide closer views of the upper portion of the fuel injectors 322 protruding from respective apertures 320 in the exterior surface 310 of the top wall 300 of a rocker housing 100. The upper portion of each fuel injector 322 may comprise a threaded exterior to facilitate connection with a fuel supply pipe (not shown).

The rocker housing 100 further comprises a fuel return channel 400 configured to return to a fuel tank (not shown) unused fuel from each fuel injector 322. The fuel return channel 400 is located within the sidewall 200.

Figure 6:
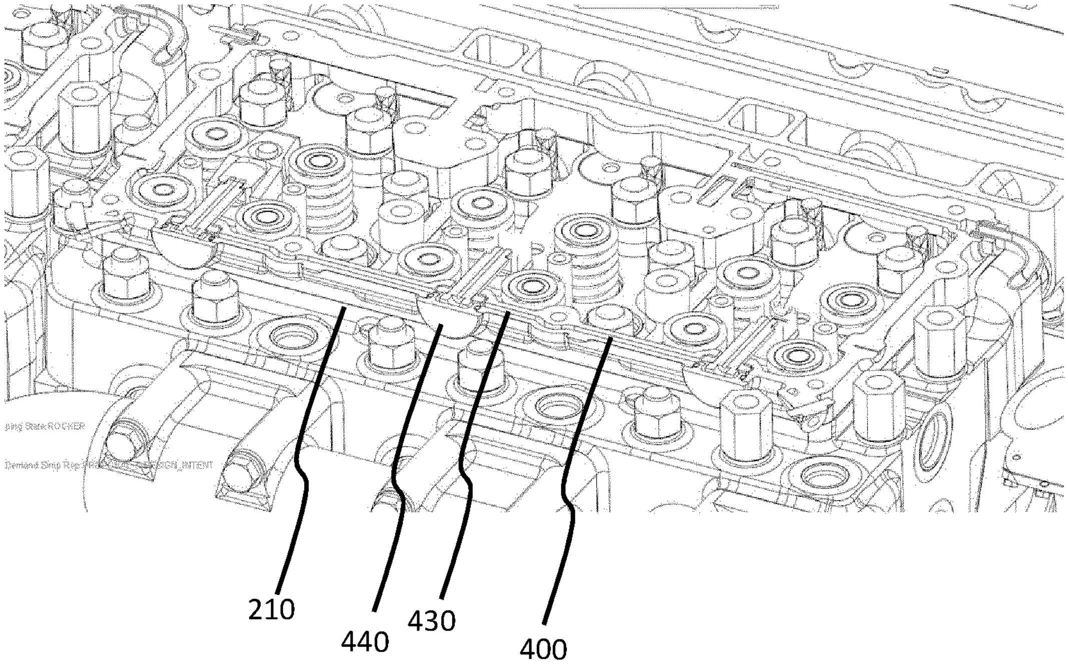
FIG. 6 shows a cutaway version of a rocker housing of the disclosure in situ on an internal combustion engine.

FIG. 6 shows a cutaway view of a rocker housing 100 in accordance with the disclosure, in situ on the internal combustion engine 10. The plane of the cutaway of FIG. 6 is parallel to a major plane of the top wall 300 of the rocker housing 100 such that only a lower half of the sidewall 200 of the rocker housing is visible in FIG. 6. In this way, an interior of part of the fuel return channel 400 is visible.

Figure 7:
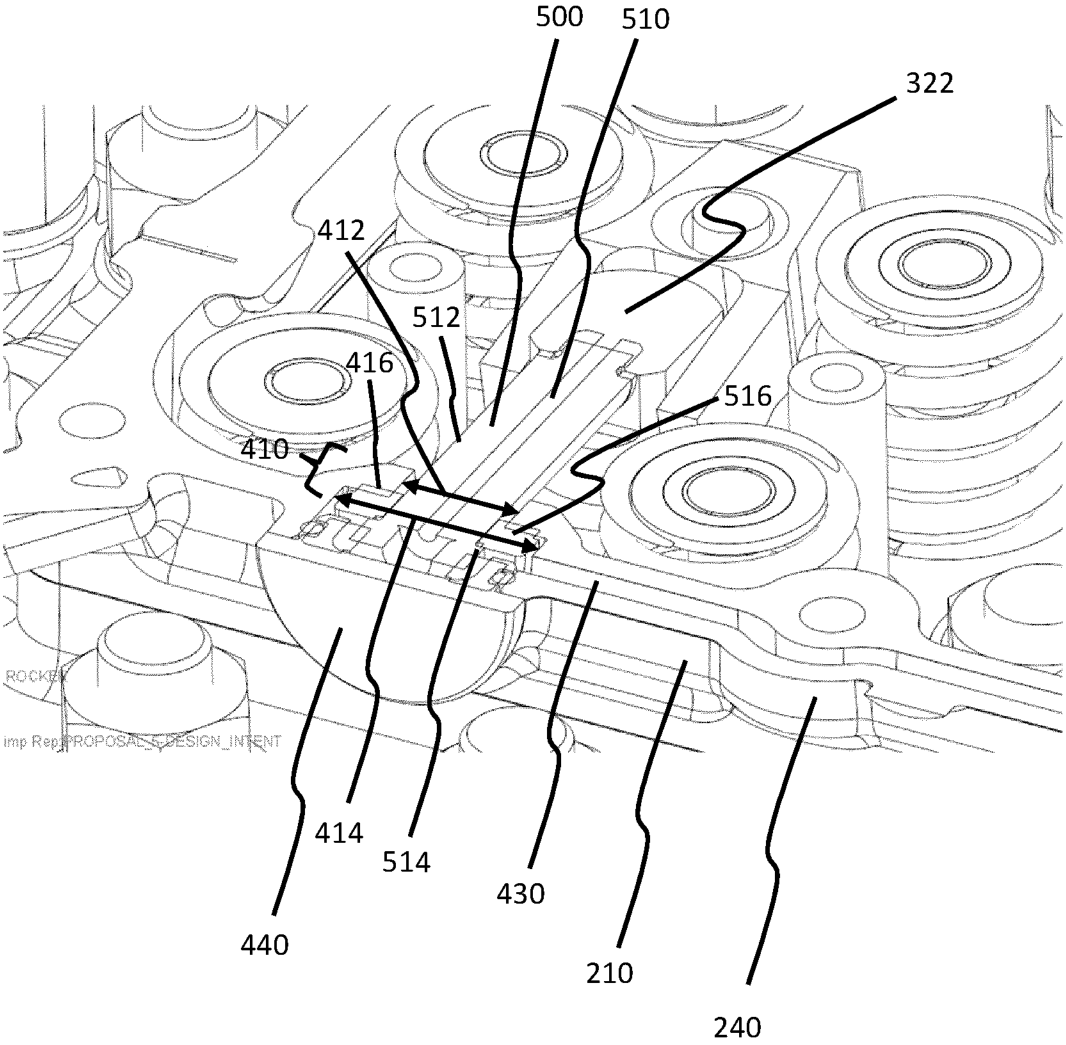
FIG. 7 shows a cutaway version of a part of a fuel return channel of a rocker housing in accordance with the disclosure.

FIG. 7 provides a closer view of a part of the fuel return channel 400.

The fuel return channel 400 comprises an inlet 410, an outlet 420 and an interior passage 430 extending between the inlet 410 and the outlet 420.

The interior passage 430 may be formed integrally in the sidewall 200 of the rocker housing between the interior surface 240 of the sidewall 200 and the exterior surface 230 of the sidewall 200. The fuel return channel 400 may have a minor component in a direction between the interior surface 240 and the exterior surface 230 of the sidewall 200 and a major component in a direction of lateral offset between the inlet 410 and the outlet 420.

The inlet 410 extends into the sidewall 200 from the interior surface 240 of the sidewall 200. The inlet 410 may be substantially perpendicular to the interior surface 240 of the sidewall 200.

The outlet 420 (not shown in FIG. 7 but shown in FIGS. 1 and 5) may be located at the exterior surface 230 of the sidewall 200. The outlet 420 is laterally offset from the inlet 410. The outlet 420 may connect onwardly to a fuel return pipe 422 (visible in FIG. 5).

The fuel return channel 400 may comprise a plurality of inlets 410 and a plurality of outlets 420. The interior passage 430 may comprise a number of limbs extending between the inlet(s) 410 and the outlet(s) 420, providing at least one route from each inlet 410 to at least one outlet 420. In the embodiment of FIG. 5, there are three inlets 410 and two outlets 420 (of which only one outlet 420 is visible). Each of the two outlets 420 in the FIG. 5 embodiment has a corresponding fuel return pipe 422 (both of which are visible).

The interior passage 430 is formed integrally in the sidewall 200 of the rocker housing between the interior surface 240 of the sidewall 200 and the exterior surface 230 of the sidewall 200. The interior passage 430 may be substantially in line with the interior surface 240 of the sidewall 200. The interior passage 430 may be substantially parallel to the interior surface 240 and/or the exterior surface 230.

Optionally, as in the embodiment shown in FIG. 7, parts of the interior passage 430 may extend in a direction substantially parallel to the interior and exterior surfaces 240, 230 of the sidewall 200.

Figure 11:
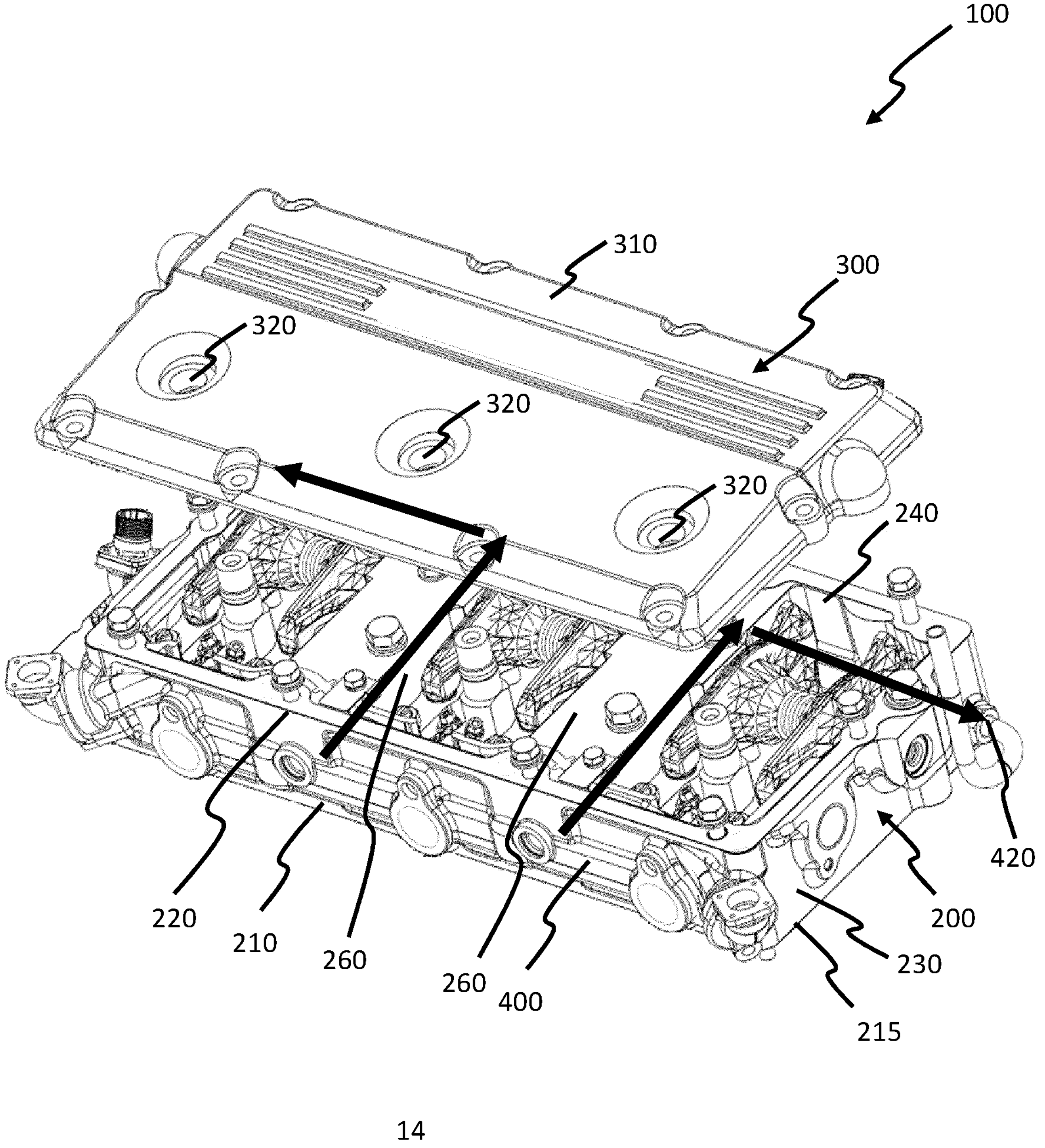
FIG. 11 shows the same view as FIG. 1 with arrows superimposed to show the approximate locations of parts of the fuel return channel that extend through the lateral braces from one side to the other of the sidewalls.

Parts of the interior passage 430 may extend through the one or more lateral braces 260 that extend between opposite sides of the sidewall 200. The approximate locations of the parts of the interior passage 430 that extend through the lateral braces of the FIG. 1 embodiment are shown by the arrows in FIG. 11.

The rocker housing 100 may be of cast metal construction. The sidewalls 200 may comprise one cast metal component and the top wall 300 may comprise another cast metal component. Accordingly, the interior passage 430 may be formed substantially via a casting process by which the rocker housing 100 is constructed.

In a rocker housing 100 configured to accommodate three fuel injectors 322 (or three fuel supply pipes) via three apertures 320 (such as that of FIGS. 1, 5 and 6), the fuel return channel 400 comprises three inlets 410, one for each injector. The fuel return channel 400 may comprise any number of outlets 420. The number of outlets 420 may be independent of the number of inlets 410. In the embodiment of FIGS. 1, 5 and 6, there are three inlets 410 and two outlets 420. The interior passage 430 may connect between the inlets 410 and outlets 420 in any appropriate way.

Referring to FIGS. 6 and 7, the or each inlet 410 may extend from the interior surface 240 of the sidewall 200, beyond the interior passage 430, to the exterior surface 230 of the sidewall 200.

The inlet 410 may comprise an inner portion having a bore 412 extending from the interior surface 240 and an outer portion comprising a coaxial counter bore 414 extending from the exterior surface 230. Between the bore 412 and the counter bore 414 there may be an annular surface 416 that accommodates the change in diameter between the bore 412 and the counter bore 414.

A rocker housing assembly may comprise the rocker housing 100 and may further comprise a plug 440 configured to fill the counter bore 414. The plug 440 may be provided to prevent fluid communication between the interior passage 430 and the exterior surface 230 of the sidewall 200. In this way, fluid entering the inlet 410 may be prevented from leaving via the counter bore 414 and may only proceed via the interior passage 430. The plug 440 may have a diameter greater than its thickness.

The rocker housing assembly may be provided with a spill tube 500 for providing fluid communication between an injector of an internal combustion engine 10 and the inlet 410 of the fuel return channel 400. By contrast with the interior passage 430 that is formed integrally in the sidewall 200 of the rocker housing, the spill tube 500 may be a separate component that is received into the bore 412 of the inlet 410 that extends from the interior surface 240 of the rocker housing 100. The spill tube 500 may provide an internal bore 510 providing fluid communication between the injector and the inlet 410 of the fuel return channel 400. In this way, any excess fuel that is not injected by the injector into the cylinder may be carried from the injector to the inlet 410 of the fuel return channel 400.

The spill tube 500 may comprise a tubular component 500 which at a first end is configured to cooperate with a fuel injector 322 and at a second end is configured to cooperate with the bore 412 of the inlet 410. The spill tube 500 may comprise a shaft 512 and an annular flange 514 at an end of the spill tube furthest from the fuel injector 322.

The spill tube 500 may be retained in position relative to the fuel injector 322. For example, the spill tube 500 may have an external thread which may be received in a bore of the fuel injector 322 having a corresponding internal thread.

Since there may be variation in the exact position of the fuel injector 322 relative to the engine (e.g. in an axial direction of the fuel injector 322), and since the spill tube 500 is fixed in position relative to the fuel injector 322, the position of the spill tube 500 relative to the bore 412 of the inlet 410 may vary.

An external diameter of the shaft 512 of the spill tube 500 may be smaller than an internal diameter of the bore 412 of the inlet 410. Also, an external diameter of the annular flange 514 may be smaller than an internal diameter of the counter bore 414. In this way, radial variation in position of the spill tube 500 relative to the bore 412 and counter bore 414 may be accommodated. This facilitates variation (including but not limited to axial variation) in the position of the fuel injector 322 relative to the engine.

In addition, as per the illustrated embodiment of FIG. 7, there may be a seal 516 located between the annular flange 514 and the annular surface 416. The seal 516 may have an external diameter that is smaller than the internal diameter of the counter bore 414 and an inner diameter that is smaller than the external diameter of the shaft of the spill tube 500. In this way, the seal 516 facilitates variation (including but not limited to axial variation) in the position of the fuel injector 322 relative to the engine.

By contrast with a rocker housing that provides a fuel return channel using pipework that is located on the exterior of the rocker housing, the absence of this requirement gives rise to a further advantage that it is capable of accommodating greater variation in position of the spill tube 500. This is because alignment of the spill tube 500 with the plug 440 (rather than an onward external pipework connection) allows a wider range of positions of spill tube without loss of functionality. This may be particularly beneficial in a remanufactured engine where the height of the fuel injector 322 to which the spill tube 500 will connect may vary depending on remanufacturing processes.

Figure 16:
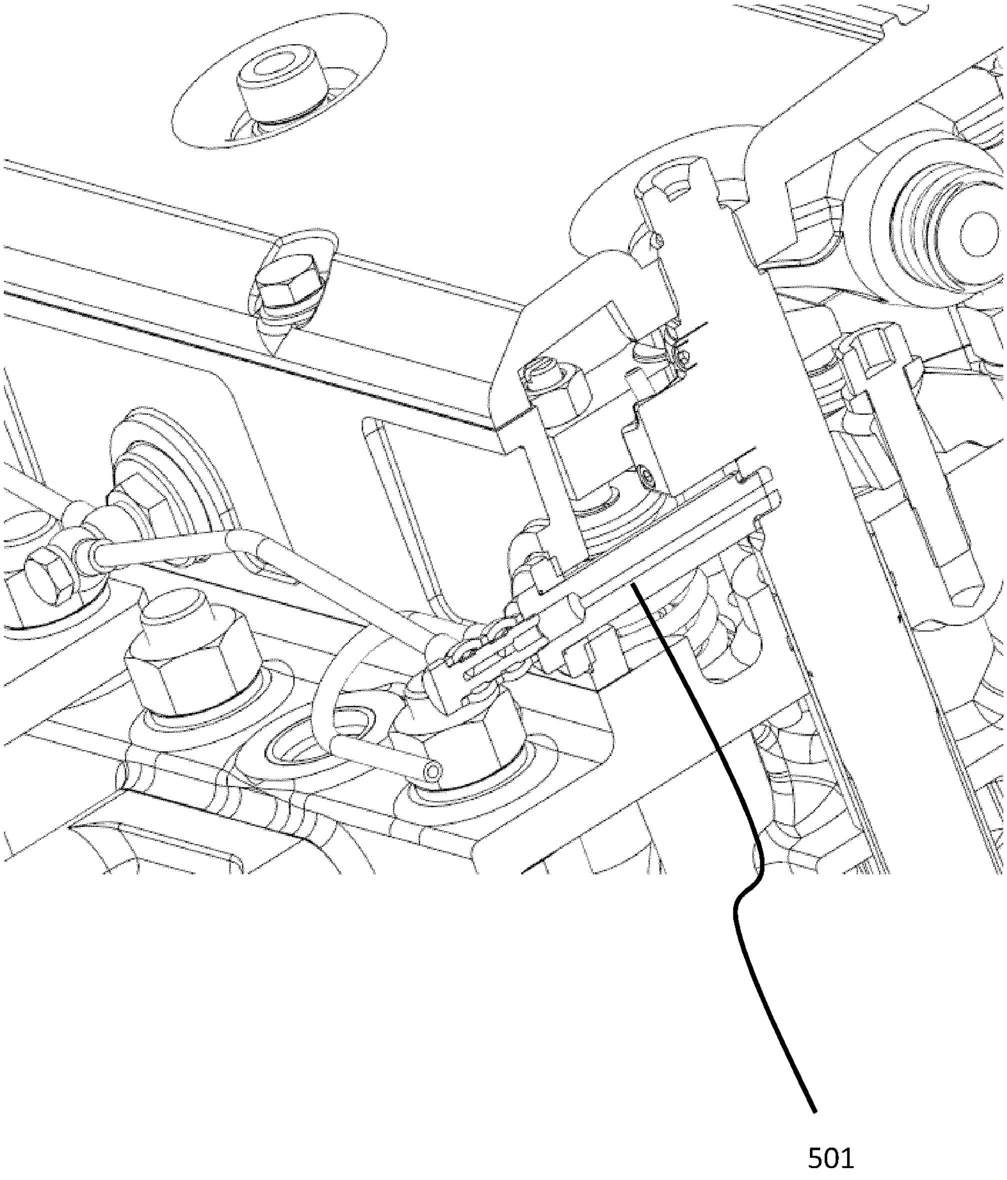
FIG. 16 shows a perspective view of part of an internal combustion engine in accordance with the prior art including a prior art spill tube providing access to pipework exterior of the rocker housing.

FIG. 16 shows a prior art engine from which it is clear that, in the prior art, accurate alignment of the spill tube 501 at both ends is necessary. By contrast, it is clear from the arrangement of the present disclosure shown in FIG. 8 that accurate alignment is necessary only on the inside because the outside is simply closed by the plug 440.

The rocker housing assembly may further be provided with a fuel return pipe 422 in fluid communication at a first end with the outlet of the fuel return channel and at a second end with the fuel tank.

Referring to FIG. 5, each plug 440 may comprise a first portion 442 configured to fill the counter bore 414 and a second portion 444 offset from the first portion 442 providing a fixing aperture 446 through which the plug 440 may be fastened, via a fixing, to the sidewall 200. The fixing may be received into a hole 246 (for example, a threaded hole) in the sidewall 200, as shown in FIG. 8.

The nature of the plug 440 is that it has a low profile. In particular, the extent to which the plug 440 protrudes out from the exterior surface 230 of the sidewall 200 is modest. In this way, interference between the plug 440 and other fixings on the engine that are proximate the rocker housing assembly is reduced and minimised.

Figure 8:
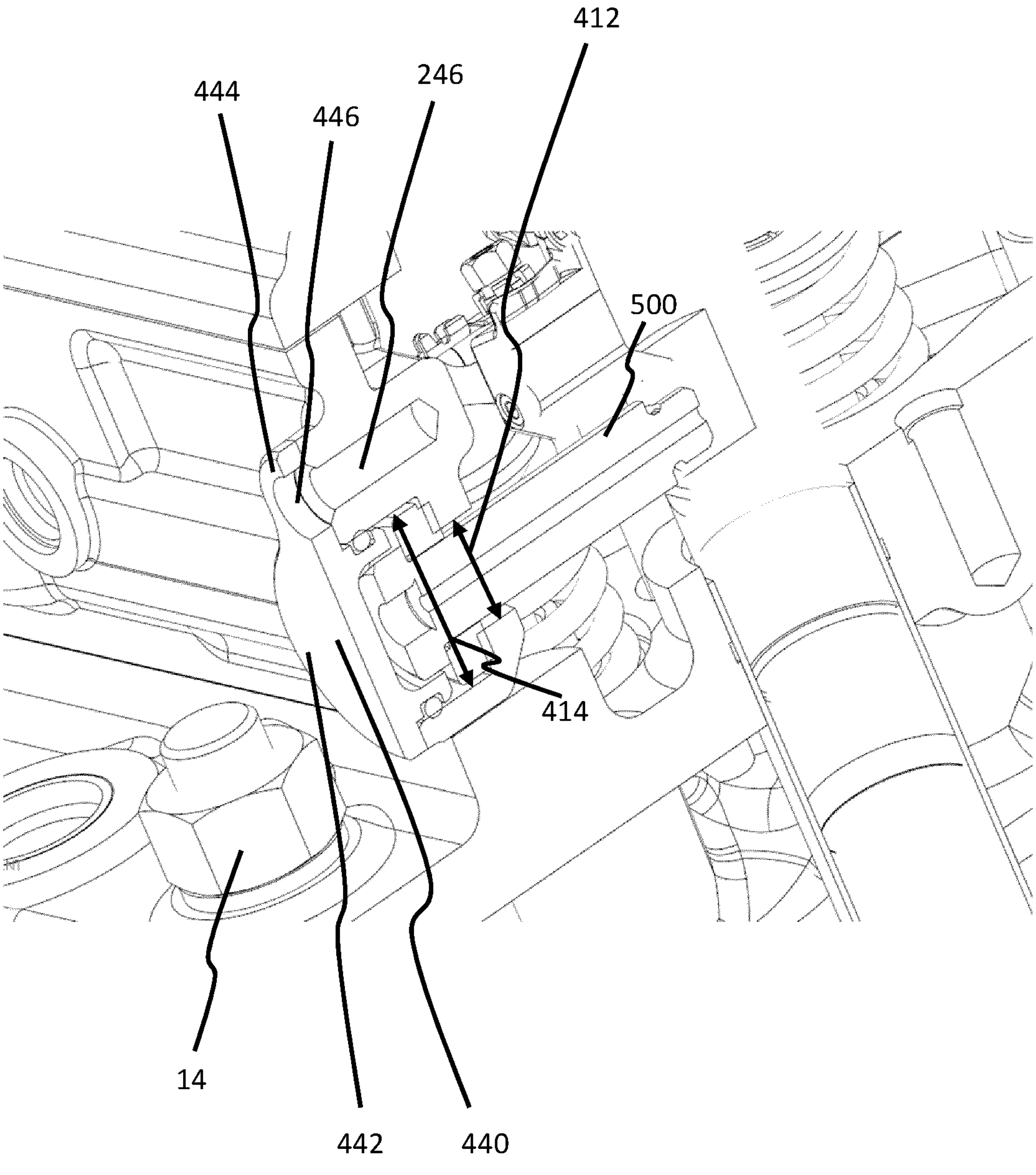
FIG. 8 shows part of the fuel return channel of a rocker housing of FIG. 7 from a different perspective.
Figure 9:
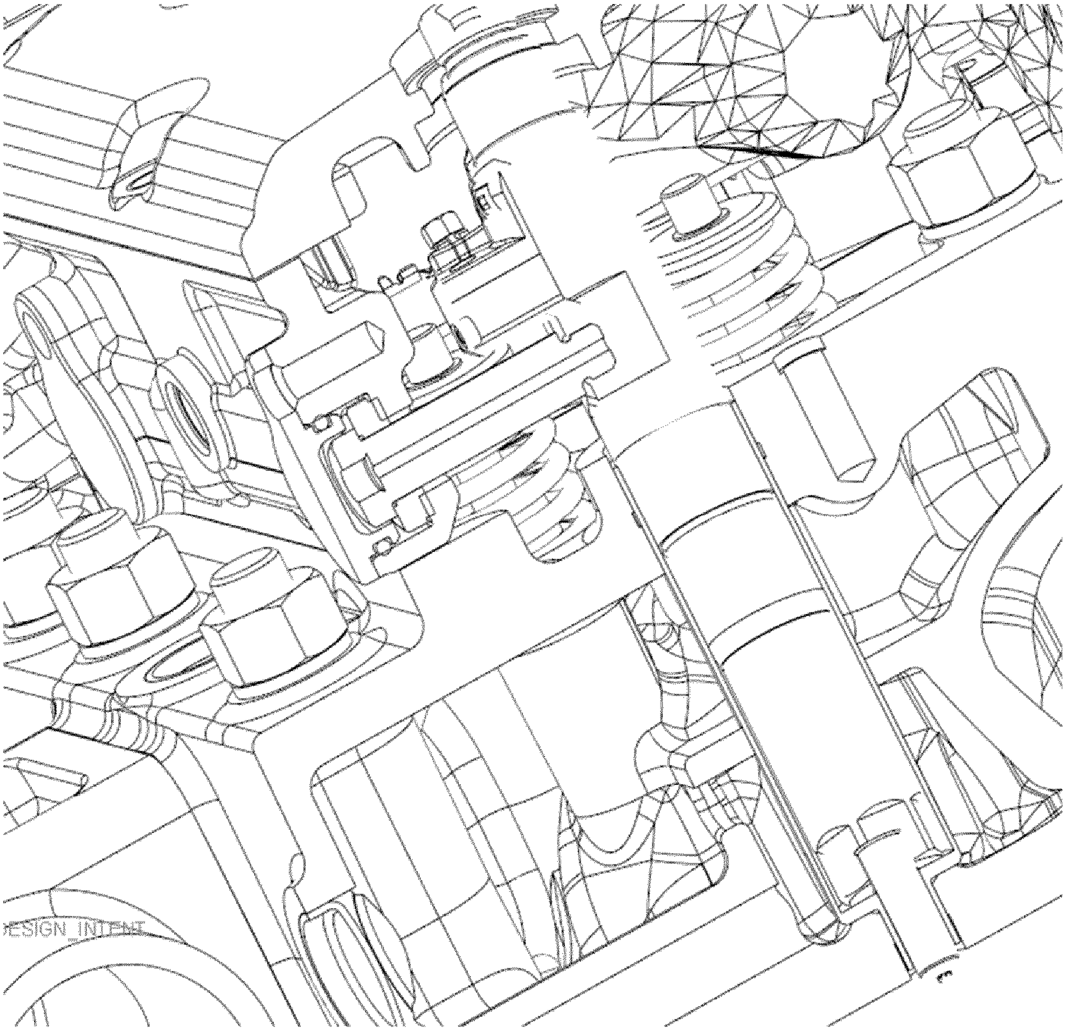
FIG. 9 shows part of the fuel return channel of a rocker housing of FIGS. 7 and 8 from a different perspective.
Figure 10:
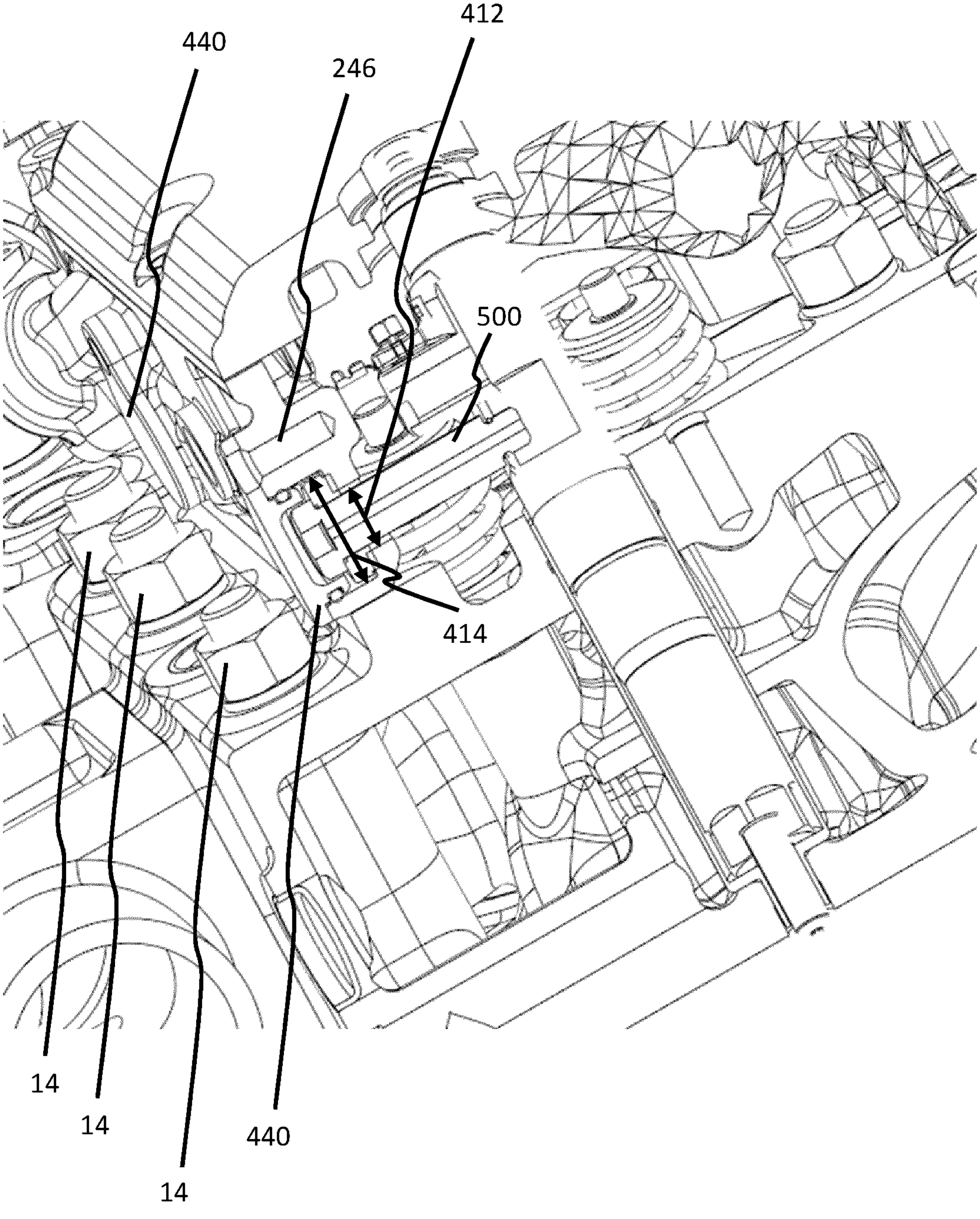
FIG. 10 shows part of the fuel return channel of a rocker housing of FIGS. 7 to 9 from a different perspective.
Figure 12:
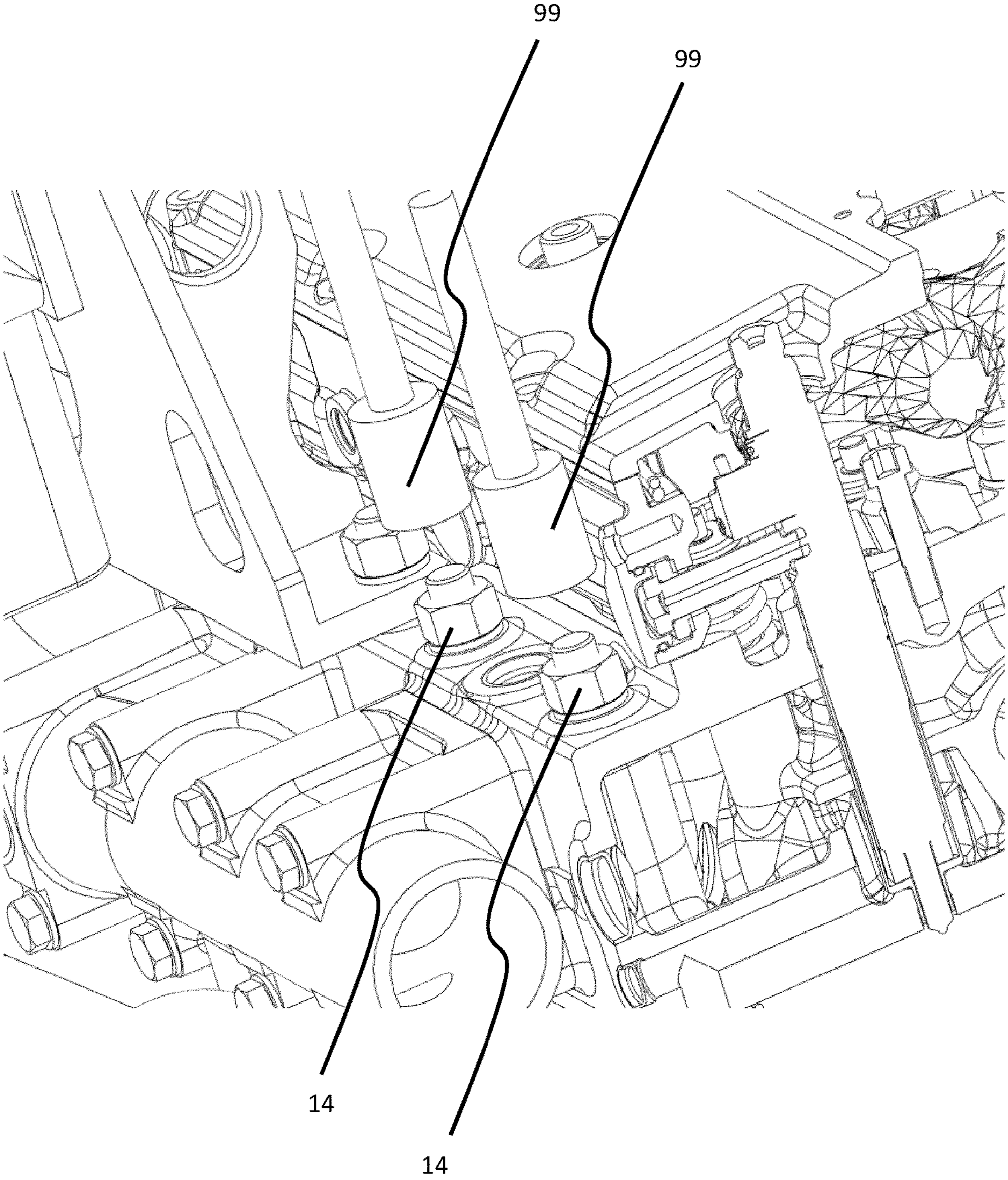
FIG. 12 shows a perspective view of a part of the internal combustion engine including the rocker housing of the disclosure alongside tooling sockets proximate cylinder head bolts.
Figure 13:
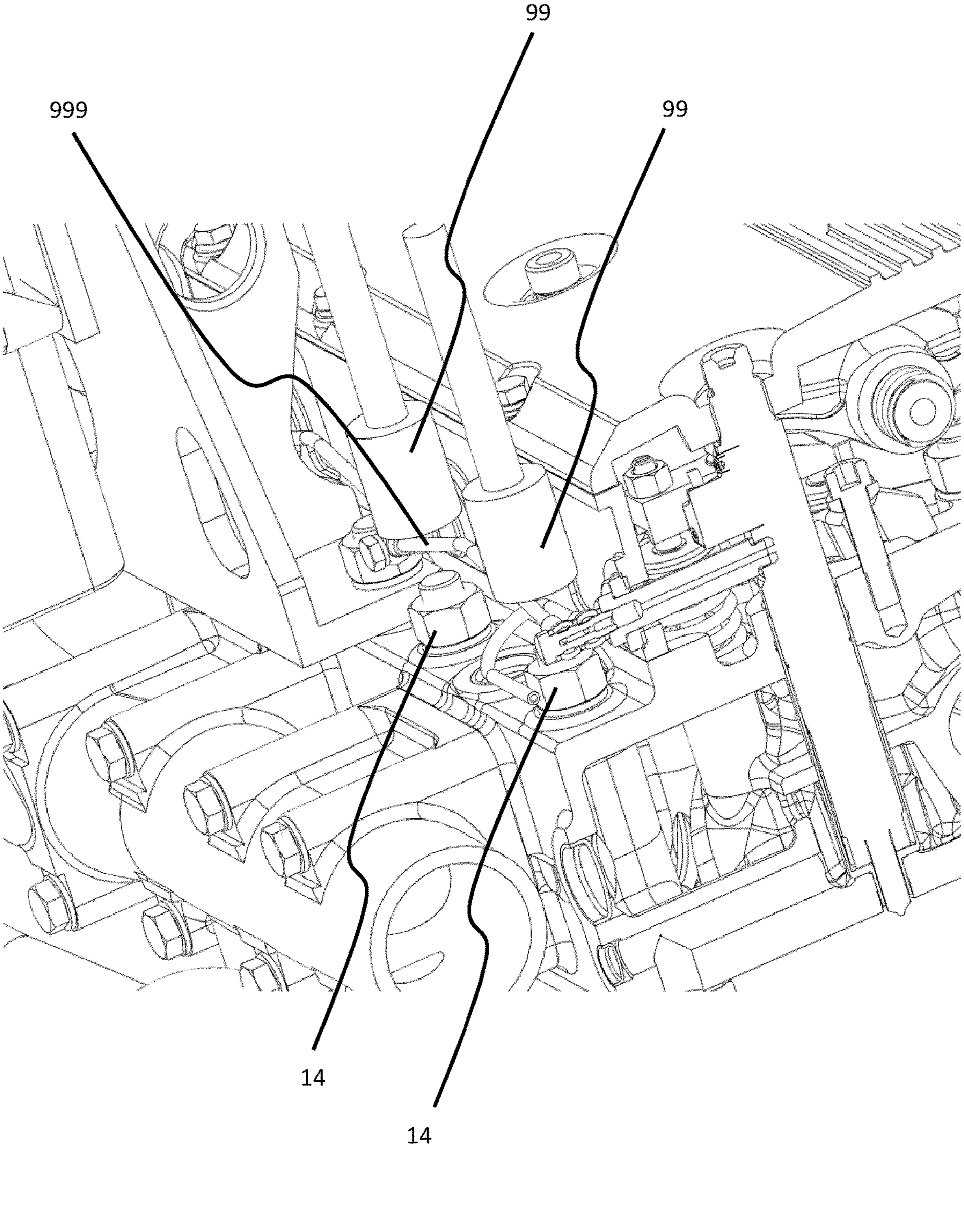
FIG. 13 shows an equivalent perspective view to FIG. 12 of an internal combustion engine according to the prior art alongside tooling sockets remote from the cylinder head bolts.
Figure 14:
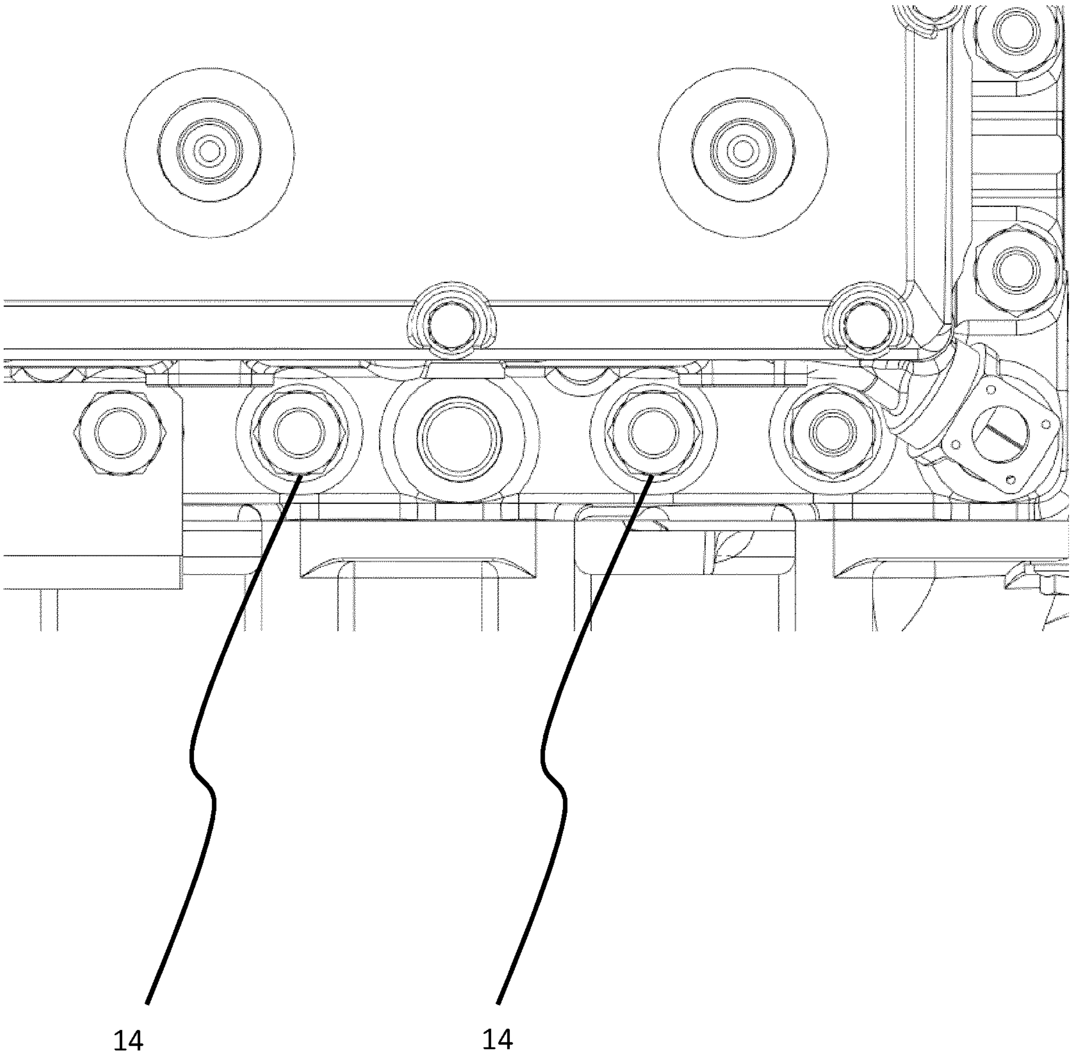
FIG. 14 shows a plan view of the components shown in perspective view in FIG. 12.
Figure 15:
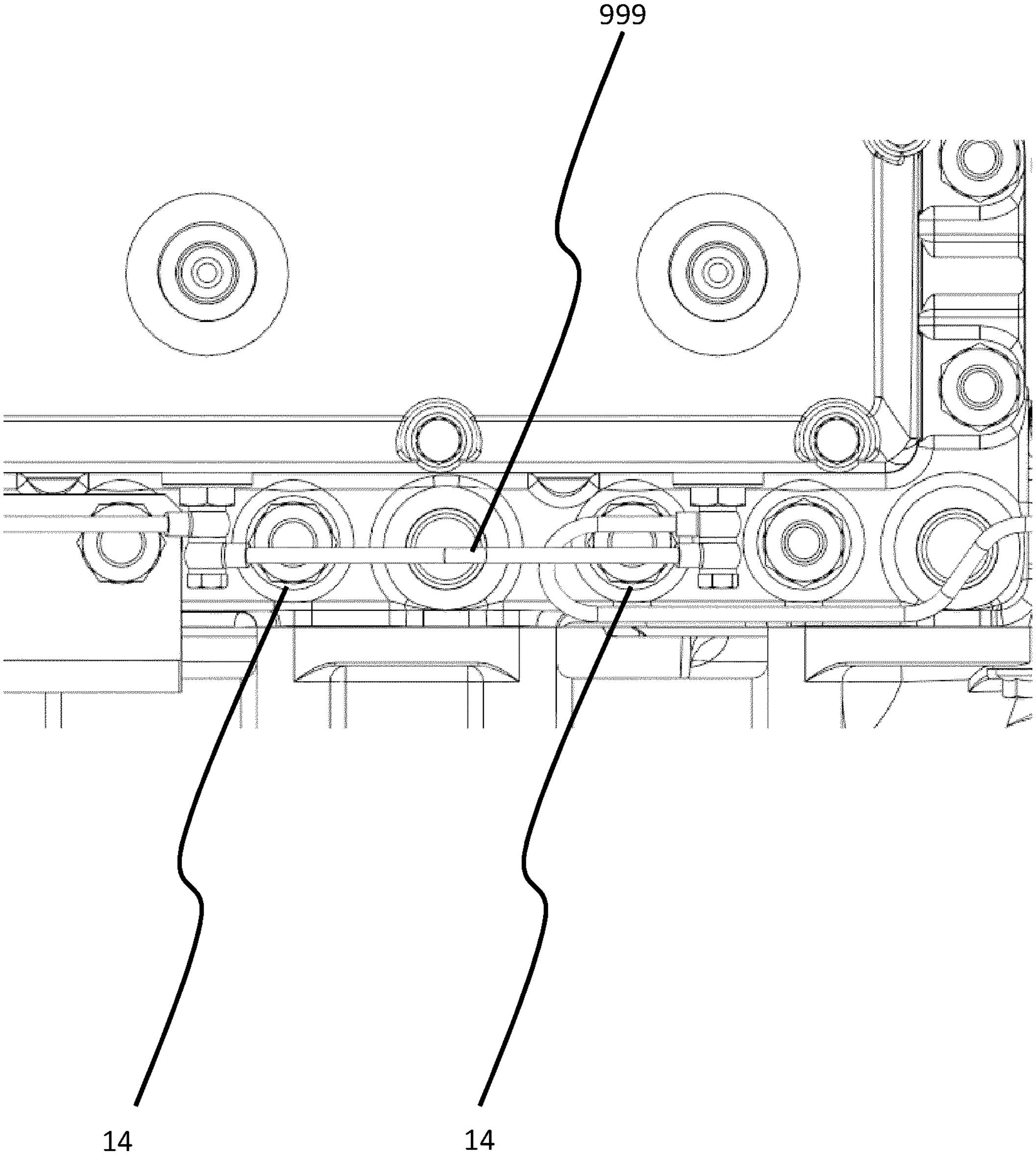
FIG. 15 shows a plan view of the components shown in perspective view in FIG. 13.

For example, as shown in FIGS. 8 and 10, cylinder head bolts 14 may protrude from the internal combustion engine 10 proximate the rocker housing 100. By providing a plug 440 having a low profile, access to the cylinder head bolts 14 may not be impeded by the plug 440. This is clear from the perspectives of FIG. 8 and FIG. 10. FIG. 12 shows a further view of a part of the internal combustion engine 10 with the cylinder head bolts 14 shown alongside tooling sockets 99 to demonstrate immediate ease of access. By contrast, FIG. 13 shows an equivalent view of an internal combustion engine according to the prior art with cylinder heads 14 inaccessible to the tooling sockets 99 without removal of external pipework 999. FIG. 14 shows the same components of the internal combustion engine 10 shown in FIG. 12 but in plan view. Similarly, FIG. 15 shows the same components of the internal combustion engine shown in FIG. 13 but in plan view.

The rocker housing 100 may further comprise one or more lateral openings 250 that may intersect with the interior passage 430 of the fuel return channel 400. These one or more lateral openings 250 may be a residual feature of the process of casting the sidewalls 200 to include the integral interior passage 430.

In order to prevent the or each lateral opening from allowing a route by which fuel may exit the interior passage 430, a bung element may be provided for the or each lateral opening 250.

In some embodiments, the interior passage 430 may comprise an initial part that extends between the three inlets 410, a pair of intermediate parts, each of which extends laterally in one of the lateral braces 260, and a pair of final parts, each of which joins one of the intermediate parts to one of the outlets 420. In this way there are two routes for fuel to exit the initial part extending between the three inlets 410. In this way, some redundancy is provided. The approximate locations of the two fuel return routes are shown by the arrows in FIG. 11.

By providing the interior passage 430 as part of the casting process by which the sidewalls 200 are produced, it is possible to provide a more complex geometry (so as to avoid other features, such as fixing holes in the sidewalls 200) than would be possible if the interior passage 430 were to be machined.

As mentioned above, the rocker housing 100 may be formed using one or more casting processes. The sidewalls 200 may comprise one cast metal component and the top wall 300 may comprise another cast metal component. Accordingly, a casting process may be employed to produce the sidewalls 200 and another casting process may be employed to produce the top wall 300.

The respective casting processes may be followed by one or more machining processes. For example, the bore 412 and coaxial counter bore 414 may be formed by a machining process once the cast sidewall 200 has been produced.

By providing the bore 412 and counter bore 414 in this way, the bore 412 and counter bore 414 can be machined specifically to accommodate the spill tube 500.

The or each outlet 420 may be formed by a machining process. The machining process may include forming a hole, and producing an internal thread in the hole to which a screw fitting may be attached.

The or each aperture 320 may be formed by a machining process. Further, the or each hole 246 may be formed by a machining process. If the hole 246 is threaded, the thread may be formed by a machining process.

The or each lateral opening 250 may be a residual feature of the casting process rather than a machined opening. The or each lateral opening 250 may support core removal of from the internal cavities post casting.

Further fixing holes, such as fixing holes for accommodating a fixing to fasten the top wall 300 to the sidewall 200 may be providing by a machining process. In this way, a degree of precision required for alignment between fixing holes may be readily achieved.

INDUSTRIAL APPLICABILITY

The rocker housing 100 of the present disclosure may be employed on new internal combustion engines and may be retrofitted on existing internal combustion engines. In this way, fuel recirculation functionality of excess fuel from the injectors to the fuel tank may be provided integrally to the rocker housing 100. In this way, no external pipework is required proximate the fuel injectors. This reduces scope for fuel leakage paths and also increases accessibility of features, such as cylinder head bolts, that are proximate the exterior of the rocker housing 100 when in situ on an internal combustion engine. Furthermore, it reduces the numbers of fluid connections that need to be disengaged when it is required to remove the rocker housing 100 and reduces the number of fluid connections that need to be engaged/reengaged when installing/reinstalling the rocker housing 100.

The invention claimed is:

1. A rocker housing configured to enclose a rocker shaft and rocker arms connected to push rods that protrude from a cylinder head of an internal combustion engine, the rocker housing comprising:

a sidewall configured to enclose the rocker shaft and the rocker arms and having a lower portion with a surface configured to contact an outer surface of the cylinder;

a top wall extending laterally from an upper portion of the sidewall so as to extend over the rocker arms;

such that an interior surface of the sidewall combined with an interior surface of the top wall together bound an interior volume of the rocker housing for enclosing the rocker arms;

the rocker housing further comprising:

a lateral bracing portion extending between opposing faces of the interior surface of the sidewall;

an aperture extending from an exterior surface of the top wall to the interior surface of the top wall and configured to accommodate a fuel injector or a fuel supply pipe for supplying fuel to a fuel injector of the internal combustion engine accessible from the interior volume of the rocker housing;

a fuel return channel extending within at least a part of the sidewall and comprising:

an inlet at the interior surface of the sidewall configured to receive excess fuel from the injector;

an outlet at an exterior surface of the sidewall configured to output the excess fuel, wherein the outlet is laterally offset from the inlet; and an interior passage extending between the inlet and the outlet, the interior passage formed integrally in the sidewall of the rocker housing between the interior surface of the sidewall and the exterior surface of the sidewall;

wherein the interior passage has a minor component in a direction between the interior surface and the exterior surface of the sidewall and has a major component in a direction of lateral offset between the inlet and the outlet; and wherein at least a portion of the interior passage is formed integrally within the lateral bracing portion.

2. The rocker housing of claim 1 wherein one or both of the sidewall and the top wall is of cast metal.

3. The rocker housing of claim 1 wherein the aperture is one of a number of apertures, wherein the number of apertures corresponds with the number of fuel injectors that the rocker housing is configured to accommodate.

4. The rocker housing of claim 1 wherein the inlet of the fuel return channel is one of a number of inlets, wherein the number of inlets corresponds with the number of fuel injectors that the rocker housing is configured to accommodate, wherein each inlet of the number of inlets is in fluid communication with the interior passage of the fuel return channel.

5. The rocker housing of claim 1 wherein at least two portions of the interior passage are formed integrally within at least two lateral bracing portions such that parallel routes are provided.

6. The rocker housing of claim 1 wherein the interior volume of the rocker housing is subdivided by one or more bracing portions, wherein a number of subdivisions corresponds with the number of cylinders that the rocker housing is configured to cover.

7. The rocker housing of claim 1 wherein the inlet extends from the interior surface of the sidewall, beyond the interior passage, to the exterior surface of the sidewall.

8. The rocker housing of claim 7 wherein the inlet comprises a bore extending from the interior surface.

9. The rocker housing of claim 7 wherein the inlet comprises a counter bore extending from the exterior surface, wherein the counter bore is coaxial with the bore.

10. The rocker housing of claim 9 wherein the inlet comprises an annular surface that accommodates a change in diameter between the bore and the counter bore.

11. An internal combustion engine comprising a rocker housing of claim 1 or a rocker housing assembly.

12. A rocker housing configured to enclose a rocker shaft and rocker arms connected to push rods that protrude from a cylinder head of an internal combustion engine, the rocker housing comprising:

a sidewall configured to enclose the rocker shaft and the rocker arms and having a lower portion with a surface configured to contact an outer surface of the cylinder;

a top wall extending laterally from an upper portion of the sidewall so as to extend over the rocker arms;

such that an interior surface of the sidewall combined with an interior surface of the top wall together bound an interior volume of the rocker housing for enclosing the rocker arms;

the rocker housing further comprising:

an aperture extending from an exterior surface of the top wall to the interior surface of the top wall and configured to accommodate a fuel injector or a fuel supply pipe for supplying fuel to a fuel injector of the internal combustion engine accessible from the interior volume of the rocker housing;

a fuel return channel extending within at least a part of the sidewall and comprising:

an inlet at the interior surface of the sidewall configured to receive excess fuel from the injector;

an outlet at an exterior surface of the sidewall configured to output the excess fuel, wherein the outlet is laterally offset from the inlet; and an interior passage extending between the inlet and the outlet, the interior passage formed integrally in the sidewall of the rocker housing between the interior surface of the sidewall and the exterior surface of the sidewall;

wherein the interior passage has a minor component in a direction between the interior surface and the exterior surface of the sidewall and has a major component in a direction of lateral offset between the inlet and the outlet;

and a plug that prevents fluid communication between the interior passage and the exterior surface of the sidewall.

13. The rocker housing assembly of claim 12 wherein the plug is received into the counter bore so as to seal the counter bore.

14. The rocker housing assembly of claim 12 wherein the plug has a diameter greater than its thickness.

15. The rocker housing assembly of claim 12 further comprising:

a spill tube providing fluid communication between the injector of the internal combustion engine and the inlet of the fuel return channel, thereby providing fluid communication between the injector and the fuel return channel.

16. The rocker housing assembly of claim 15 wherein the spill tube comprises a tubular component that is received into the bore.

17. The rocker housing assembly of claim 16 wherein the spill tube comprises a shaft and an annular flange, wherein:

the shaft has an external diameter that is smaller than an internal diameter of the bore such that the shaft is movable radially with respect to the bore; and the annular flange has an external diameter that is smaller than an internal diameter of the counter bore such that the annular flange is movable radially within the counter bore.

18. The rocker housing assembly of claim 17 wherein the rocker housing assembly further comprises a seal located between the annular flange of the spill tube and the annular surface of the inlet of the rocker housing.

19. The rocker housing assembly of claim 18 wherein the seal has an external diameter that is smaller than the internal diameter of the counter bore and an inner diameter that is smaller than the external diameter of the shaft of the spill tube.

20. The rocker housing assembly of claim 12 further comprising a fuel return pipe in fluid communication at a first end with the outlet of the fuel return channel and at a second end with a fuel tank.

21. A rocker housing assembly comprising:

a rocker housing configured to enclose a rocker shaft and rocker arms connected to push rods that protrude from a cylinder head of an internal combustion engine, the rocker housing comprising:

a sidewall configured to enclose the rocker shaft and the rocker arms and having a lower portion with a surface configured to contact an outer surface of the cylinder head surrounding the rocker arms;

a top wall extending laterally from an upper portion of the sidewall so as to extend over the rocker arms;

such that an interior surface of the sidewall combined with an interior surface of the top wall together bound an interior volume of the rocker housing for enclosing the rocker arms;

the rocker housing further comprising:

a lateral bracing portion extending between opposing faces of the interior surface of the sidewall;

an aperture extending from an exterior surface of the top wall to the interior surface of the top wall and configured to accommodate a fuel injector or a fuel supply pipe for supplying fuel to a fuel injector of the internal combustion engine accessible from the interior volume of the rocker housing;

a fuel return channel extending within at least a part of the sidewall and comprising:

an inlet at the interior surface of the sidewall configured to receive excess fuel from the injector;

an outlet at an exterior surface of the sidewall configured to output the excess fuel, wherein the outlet is laterally offset from the inlet; and an interior passage extending between the inlet and the outlet, the interior passage formed integrally in the sidewall of the rocker housing between the interior surface of the sidewall and the exterior surface of the sidewall;

wherein the interior passage has a minor component in a direction between the interior surface and the exterior surface of the sidewall and has a major component in a direction of lateral offset between the inlet and the outlet;

wherein the inlet extends from the interior surface of the sidewall, beyond the interior passage, to the exterior surface of the sidewall and the inlet a bore extending from the interior surface;

wherein the rocker housing assembly further comprises a spill tube providing fluid communication between the injector of the internal combustion engine and the inlet of the fuel return channel, thereby providing fluid communication between the injector and the fuel return channel;

wherein the spill tube comprises a tubular component that is received into the bore; and wherein at least a portion of the interior passage is formed integrally within the lateral bracing portion.

* * * * *